United States Patent Office 3,812,131
Patented May 21, 1974

---

3,812,131
PHENYLENE-BIS-DITHIOCARBAMIC
ACID ESTERS
Manfred Schorr, Frankfurt am Main, Walter Durckheimer, Hattersheim am Main, Lothar Behrendt, Konigstein, Taunus, and Dieter Duwel, Hofheim, Taunus, Germany, assignors to Farbwerke Hoechst Aktiengesellschaft vormals Meister Lucius & Bruning, Frankfurt am Main-Hoechst, Germany
No Drawing. Original application Sept. 8, 1970, Ser. No. 70,485, now Patent No. 3,676,446, dated July 11, 1972. Divided and this application Apr. 17, 1972, Ser. No. 244,981
Claims priority, application Germany, Sept. 20, 1969,
P 19 47 746.4
Int. Cl. C07d 33/60, 35/44
U.S. Cl. 260—283 S
3 Claims

ABSTRACT OF THE DISCLOSURE

Anthelmintically active phenylene-bis-dithiocarbamic acid esters of the formula

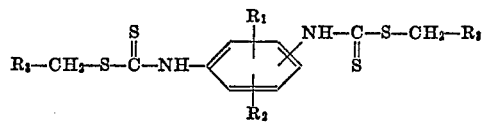

in which $R_1$ and $R_2$ are equal or different and represent hydrogen, halogen, alkyl or alkoxy having from 1 to 6 carbon atoms and $R_3$ is pyridyl, quinolyl or isoquinolyl which may be substituted by one or more alkyl radicals having from 1 to 6 carbon atoms. A process for their preparation.

---

This is a division of application Ser. No. 70,485 filed Sept. 8, 1970, now U.S. Pat. 3,676,446.

The present invention relates to bis-dithiocarbamic acid esters of the general formula I

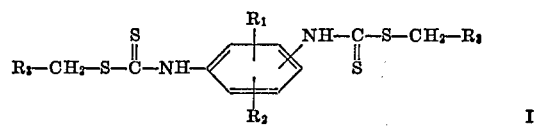

in which $R_1$ and $R_2$ are equal or different and represent hydrogen, halogen, alkyl or alkoxy having from 1 to 6 carbon atoms and $R_3$ is, quinolyl or isoquinolyl which may be substituted by one or more alkyl radicals having from 1 to 6 carbon atoms.

The present invention further relates to a process for the preparation of the said compounds which comprises reacting a water-soluble salt of a bis-dithiocarbamic acid of the formula II

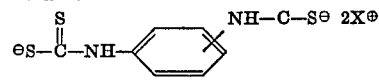

in which $X^\ominus$ represents one cation-equivalent with a reactive ester of an alcohol of the formula III

  III

By the term "reactive esters" there are understood especially chlorides, bromides and iodides, further, for example, sulfonates, methylsulfonates (mesylates) and toluenesulfonates (tosylates). The following substances may thus be used as starting materials: 2-chloromethylquinoline, 2-bromomethylquinoline, 3-chloromethylquinoline, 4-chloromethylquinoline, 1-chloromethylisoquinoline, 3-chloromethylisoquinoline, 4-chloromethylisoquinoline, 1-chloromethyl-4-methylisoquinoline. These compounds are advantageously used as hydrochlorides and, at the beginning of the reaction, set free by addition of the equivalent amount of base.

The salts of the phenylene-bis-dithiocarbamic acid esters of the formula II can be obtained by the method described by van der Kerk et al. (Rec. 74, 1268 (1955)). Advantageously, the alkaline, alkaline earth or ammonium salts as well as the salts of organic bases, especially tertiary amines, are used.

The reaction is advantageously carried out as follows: a compound of the formula III dissolved in a water-miscible solvent, for example acetone, alcohol, tetrahydrofurane, dioxane, acetonitrile, formamide, dimethylformamide, or dimethylsulfoxide, is added to the aqueous solution of a phenylene-bis-dithiocarbamate. The reaction product, which precipitates after a short time, is separated and purified by washing or reprecipitating from suitable solvents. According to another operation mode, it is also possible to prepare in situ the phenylene-bis-dithiocarbamate from the corresponding phenylenediamine, carbon disulfide and alkali or ammonia and then to react it immediately with a halogen derivative of a compound of the formula III. The reaction temperature should be between about 0° and 60° C., room temperature being preferred.

The phenylene-bis-dithiocarbamic acid esters of the present invention are chemotherapeutically active and suitable for fighting helminthic diseases in mammals. They are especially active against several species of cat liver fluke (Opisthorchis felineus, Opisthorchis viverini, Clonorchis sinensis), and against which up to now no specific chemotherapeutic agent exists. Liver fluke diseases are an important problem in many countries of Asia.

The chemotherapeutic tests were carried out using gold hamsters which had been infected with Opisthorchis felineus. The examined compounds were applied orally to the animals for three to five consecutive days (once each day). The success of the treatment was judged by examination of the excrements for egg-secretion as well as by dissection.

The invention compounds are advantageously used for the production of orally applicable preparations for the treatment of helmintic diseases.

Suitable medical preparations are for example capsules, dragées, tablets etc., which may contain, in addition to the invention compounds, the usual auxiliaries and carriers. It is also possible to combine the products of the invention with other chemotherapeutic agents. The dose of the active substance to be used depends on the compound incorporated as active ingredient and on the desired effect.

The following example illustrate the invention.

EXAMPLE I (a) 1,3-phenylene-bis-dithiocarbamic acid quinolyl-2-methyl ester 7.35 g. (0.025 mol) of the ammonium salt of 1,3-phenylene-bis-dithiocarbamic acid were dissolved in 200 cc. of water, and a solution of 5 g. of sodium bicarbonate and 10.7 g. of 2-chloromethylquinoline-hydrochloride in 100 ml. of methanol was added while stirring at room temperature. The precipitate formed after some time was suction-filtered, washed with acetone and ether and dried in vacuo. 5 g. (37%) of 1,3-phenylene-bis-dithiocarbamic acid quinolyl-2-methyl ester, decomposition point 128–129° C. were obtained.

Quantitative analysis: $C_{28}H_{22}N_4S_4$ (M.W. 542.8). Calculated: C, 61.97; H, 4.09; N, 10.32; S, 23.64. Found: C, 61.9; H, 4.1; N, 10.6; S, 23.4.

In an analogous manner there was obtained: (b) 2-methyl-1,4-phenylene-bis-dithiocarbamic acid quinolyl-2-methyl ester, decomposition beginning at 133° C.

What is claimed is:

1. Bis-dithiocarbamic acid ester of the formula I

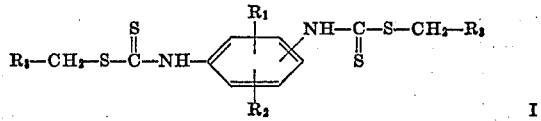

in which $R_1$ and $R_2$ are equal or different and are hydrogen, halogen, methyl or methoxy, and $R_3$ is quinolyl or isoquinolyl, which may be substituted by methyl.

2. 1,3 - phenylene-bis-dithiocarbamic acid quinolyl-2-methyl ester.

3. 2-methyl-1,4-phenylene-bis-dithiocarbamic acid quinolyl-2-methyl ester.

References Cited
UNITED STATES PATENTS

| | | | |
|---|---|---|---|
| 3,308,128 | 3/1967 | Robinson | 260—283 S |
| 3,391,146 | 7/1968 | Godfrey | 260—283 S |
| 3,705,151 | 12/1972 | Weber | 260—283 S |

DONALD G. DAUS, Primary Examiner

U.S. Cl. X.R.

424—258; 260—283 BI